United States Patent [19]

Rayburn

[11] 3,750,518

[45] Aug. 7, 1973

[54] SELF-DRILLING BLIND RIVET

[75] Inventor: Charles Calvin Rayburn, Glenview, Ill.

[73] Assignee: Illinois Tool Works, Inc., Chicago, Ill.

[22] Filed: June 7, 1972

[21] Appl. No.: 260,683

[52] U.S. Cl. .................................. 85/68, 85/70
[51] Int. Cl. .................................. F16b 13/04
[58] Field of Search ............... 85/68, 70, 71, 75, 85/77, 78

[56] References Cited
UNITED STATES PATENTS

| | | | |
|---|---|---|---|
| 2,406,157 | 8/1946 | Nelson | 85/77 |
| 2,409,352 | 10/1946 | Gill | 85/70 |
| 2,435,144 | 1/1948 | Kubicki | 85/70 |
| 3,085,463 | 4/1963 | Hallock | 85/70 |
| 3,197,987 | 8/1965 | Martin | 85/70 |
| 3,453,927 | 7/1969 | Moore | 85/68 |

FOREIGN PATENTS OR APPLICATIONS

| | | | |
|---|---|---|---|
| 1,525,224 | 4/1968 | France | 85/85 |
| 705,797 | 5/1966 | Italy | 85/68 |

*Primary Examiner*—Marion Parsons, Jr.
*Attorney*—Robert W. Beart et al.

[57] ABSTRACT

A self-drilling and blind-setting rivet assembly for power tool application to workpiece means, and including a hollow rivet sleeve with an outward radial head flange at the outer end thereof configured for a rotatable driving connection with a power tool and with the inner end portion thereof configured for engagement with cooperative means on an included shank with a drilling head at the inner end thereof whereby torque is transmitted through the rivet sleeve to the drilling head at the end of the shank for causing the drilling head to penetrate the workpiece means in locating the rivet sleeve, and the shank having an area of weakness in rear of the drilling head for fracture thereof upon withdrawal of the shank to collapse and blind set the rivet sleeve in position securing together the workpice means.

9 Claims, 3 Drawing Figures

Patented Aug. 7, 1973 3,750,518
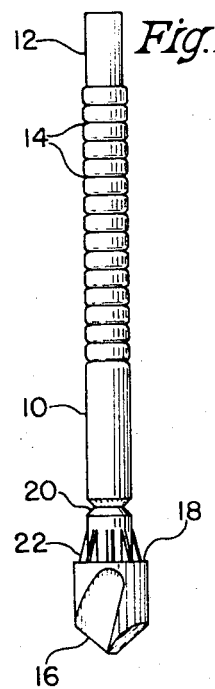
Fig.1
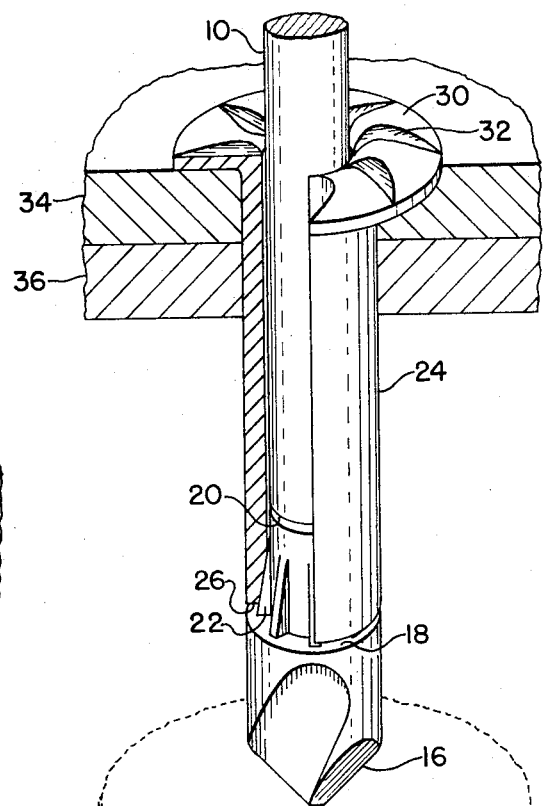
Fig.2
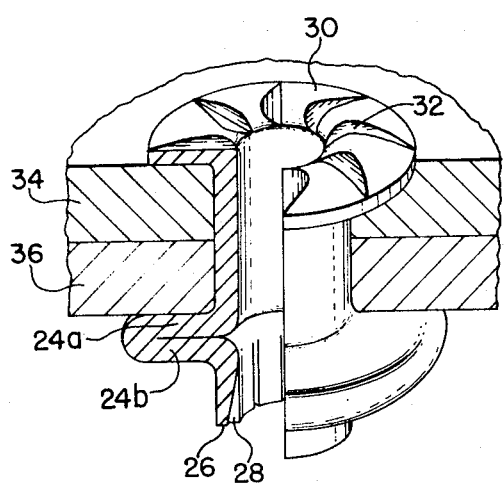
Fig.3
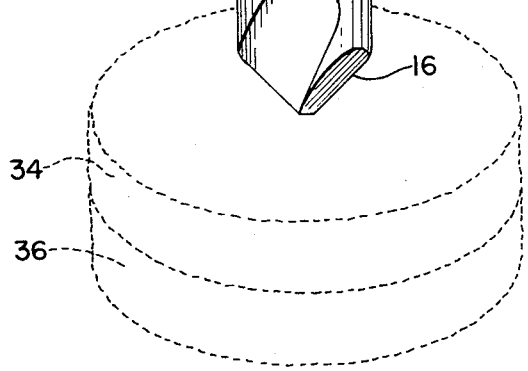

SELF-DRILLING BLIND RIVET

There have been developments in so-called pop rivets, blind-setting rivets, as well as self-drilling blind-setting rivets, for riveting sheet metal work parts in the fabrication of products therefrom without requiring access to both sides of the sheet metal work parts. Self-drilling blind-setting rivets generally include a hollow rivet sleeve with a radial head at the outer end thereof and a shank extending therethrough with a rearwardly shouldered drilling tip at the inner end thereof. Power tools for the application and setting of this latter type of rivet have also been developed such that the drilling tip is rotated to drill a hole through the work parts of sufficient size for the rivet sleeve to follow therethrough and then be axially collapsed upon withdrawal movement of the shank for blind setting the rivet sleeve. The shank has been designed with a weakened portion for separation upon completion of the upsetting of the rivet sleeve. Generally, with this type of rivet, the shank is positively rotated by the power tool for the drilling operation and so must transmit the torque through the weakened portion to the drilling tip. With some materials to be fabricated, the weakened portion of the shank does not permit sufficient torque to be transmitted to the drilling tip without premature shearing at the weakened portion which has been variously provided as by notching, peripheral grooving or aperturing the shank.

The present invention is concerned with improvements in self-drilling blind-setting rivets and one of the principal objects is to effect rotation of the drilling tip by torque transmission thereto through the rivet sleeve.

Another object of the invention is to provide a self-drilling and blind-setting rivet of the above type wherein the head end of the sleeve is provided with clutching means adapted for a rotating driving connection with a power tool and with the inner end of the sleeve having a driving connection with the drilling tip of the shank.

A further object of the invention is to provide a self-drilling and blind-setting rivet of the above type wherein the driving connection at the inner end of the sleeve is along the shank in advance of the weakened portion which may be designed in accordance with only tensile load considerations.

The above and other objects of the invention will in part be obvious and will be hereinafter more fully pointed out.

In the accompanying drawing:

FIG. 1 is a side elevation of the shank and drilling tip;

FIG. 2 is an enlarged perspective view, partly in section, showing the assembled shank and rivet sleeve initially applied to workpieces shown in broken lines and then drilled therethrough by the drilling tip with the workpieces shown in section, and FIG. 3 is a further slightly enlarged perspective view, partly in section, showing the rivet sleeve completely set in securing together the workpieces.

With reference to FIG. 1, the shank 10 may be variously contoured along the length thereof for adaptation to various types of power tools, particularly in connection with the withdrawal thereof for upsetting the rivet sleeve, but it is illustrated as including a reduced end portion 12 and intermediate peripheral groove formations 14 into which a chuck may lock for placing the shank in tensioned withdrawal for setting the rivet. The inner end of the shank is provided with a drilling head or tip 16 larger in diameter than the shank to present an outward radial shoulder 18 facing the outer end of the shank. Above the shoulder 18, the shank is provided with a weakened portion 20 which may take the form of the illustrated peripheral groove or other forms, such as spaced notches or aperture means, to weaken the shank for separation in this area after the rivet sleeve is set. Intermediate the weakened area 20 and the shoulder 18, the shank is provided with longitudinally extending ribs 22 or other spline-like clutching means spaced therearound and tapering outwardly and downwardly to the shoulder 18.

With reference to FIG. 2, the rivet sleeve 24 is shown assembled with the included shank 10 with the inner end 26 of the sleeve positioned in adjacency to the shoulder 18 on the drilling head 16 for permissive abutment therewith. This inner end portion of the sleeve 24 is provided with longitudinal recesses 28 complemental to and receiving the ribs 22 on the shank for clutched interengagement therewith. The opposite or outer end of the sleeve 24 is provided with an outward radial head flange 30 which is provided with radial notches 32 on the outer face thereof for cooperative clutching engagement with torque producing means of a suitable power tool (not shown). Upon association with such a tool, the notched head 30 will be directly rotated thereby but without direct rotation of the shaft by the power tool. The rotated sleeve 24 wil transmit torque to the clutching means provided by the interengaged ribs 22 on the shank and recesses 28 on the sleeve and thus rotate the drilling head 16 with the sleeve held in compression which may be supplemented by some compression on the shaft to initially penetrate the workpieces 34, 36 shown in broken lines in FIG. 2, and drill therethrough to position the sleeve and shaft relative to the workpieces 34, 36 as shown in section below the head flange 30 in FIG. 2.

From the position of the assembly shown in FIG. 2 to the set position of the rivet as shown in FIG. 3, the power tool will have operated to withdraw the shank 10 while holding the head flange 30 against the workpiece 34. A separate upsetting tool may be employed but preferably the same tool used for drilling is employed for withdrawing the shank to upset the rivet sleeve as by direct pulling tension on the shank by means of the tool chucking arrangement engaging one of the shank recesses 14 for this purpose. During this forced withdrawal of the shank, there will be some wedging between the ribs 22 and recesses 28 and ultimate abutting between the end 26 of the rivet sleeve and the shoulder 18 on the shank, if necessary, to effect collapse of the sleeve to the position of FIG. 3 in which position one fold 24a of the collapsed sleeve engages the inner workpiece 36 and another fold portion 24b backs up the fold portion 24a in securing together the workpieces 34, 36 between the collapsed sleeve folds and the head flange 30. After the rivet sleeve is set as indicated above, continued outward withdrawal effort, as by tension, on the shank 10 will stress the weakened grooved or notched area 20 to the breaking point and cause separation and withdrawal of the tool attached shank portion. The remnant end of the shank with the drilling head may drop out or, if wedged by the rib and recess connection with the sleeve, it may be tapped out if presence thereof is objectionable in the riveted point. With the described arrangement of imparting rotation to the shank through the sleeve, the degree of weakening the shank for tensile separation may vary widely since only tensile requirements need be considered for the shaft. Thus, the annular groove form of weakness 20 may be varied in depth and may be conveniently formed in an inexpensive manner as the groove formations 14 are formed on the shank. The toughness or hardness of the material of the workpieces must be taken into consideration in determining the torque transmitting requirements of the sleeve. In some instances, it may be necessary to harden the lower portion of the sleeve and in order to prevent stripping between the sleeve and shank at the clutching connection.

In certain materials, it may be possible to effect the torque transmission between the sleeve and shank without the use of both the ribs 22 and recesses 28. Accordingly, such modifications are considered to be within the scope of this invention.

While the sleeve has been shown and described as being deformed in a particular manner, it should be apparent that it is only important for purposes of this invention that the sleeve be deformed to prevent withdrawal of the rivet sleeve.

Accordingly, it will be understood that the description of the preferred embodiment is not intended to limit the invention to that embodiment. On the contrary, it is intended to cover all alternatives, modifications and equivalents as may be included within the spirit and scope of the invention as defined by the appended claims.

I claim:

1. A self-drilling and blind-setting rivet assembly adapted for power tool application to workpiece means; and comprising a hollow rivet sleeve with an outward radial head flange at the outer end thereof and said head flange having clutch surface means adapted for cooperative engagement with torque transmitting means of a power tool to impart rotation to the sleeve, a shank extending through said sleeve with a drilling tip at the inner end thereof presenting an outward shoulder proximate to the inner end of said sleeve and said shank including an intermediate transversely weakened section for ultimate fracture, and means providing an interengaged rotatable drive connection between the sleeve and the shank for imparting rotation to the shank and drilling tip from the head flange through the sleeve without torque transmission loading through the weakened section, whereby to effect penetration of the workpiece means by rotation of the drilling tip and positioning of the rivet sleeve relative thereto for subsequent withdrawal of the shank to effect blind setting collapse of the rivet sleeve in opposition to the head flange and fractural separation of the shank at the weakened section.

2. A rivet assembly as claimed in claim 1, wherein the weakened section comprises recess means located in the vicinity of said drive connection.

3. A rivet assembly as claimed in claim 1, wherein the drive connection comprises mutually interengaged longitudinal rib and recess means between the inner end portion of the sleeve and the shank.

4. A rivet assembly as claimed in claim 3, wherein the said rib and recess means are located between the weakened section and the drilling tip for rotation of the shank without torque transmission through the weakened section.

5. A rivet assembly as claimed in claim 4, wherein the clutch surface means comprises radial notches on the head flange.

6. A rivet assembly as claimed in claim 1, wherein the drive connection comprises ribs projecting along the shank from said shoulder and complemental recesses on the inner end portion of the sleeve, with the weakened section closely adjacent to the ribs toward the outer end of the shank.

7. A rivet assembly as claimed in claim 6, wherein the weakened section comprises peripheral groove means.

8. A rivet assembly as claimed in claim 7, wherein the shoulder and adjacent end of the sleeve are positioned for permissive abutment upon withdrawal of the shank in collapsing the rivet sleeve.

9. A rivet assembly as claimed in claim 8, wherein the clutch surface means comprises radial notch means on the exposed surface of the head flange.

* * * * *